Sept. 24, 1957    A. E. RESNIK    2,807,198
DUAL CHANNEL CAMERA
Filed June 27, 1956
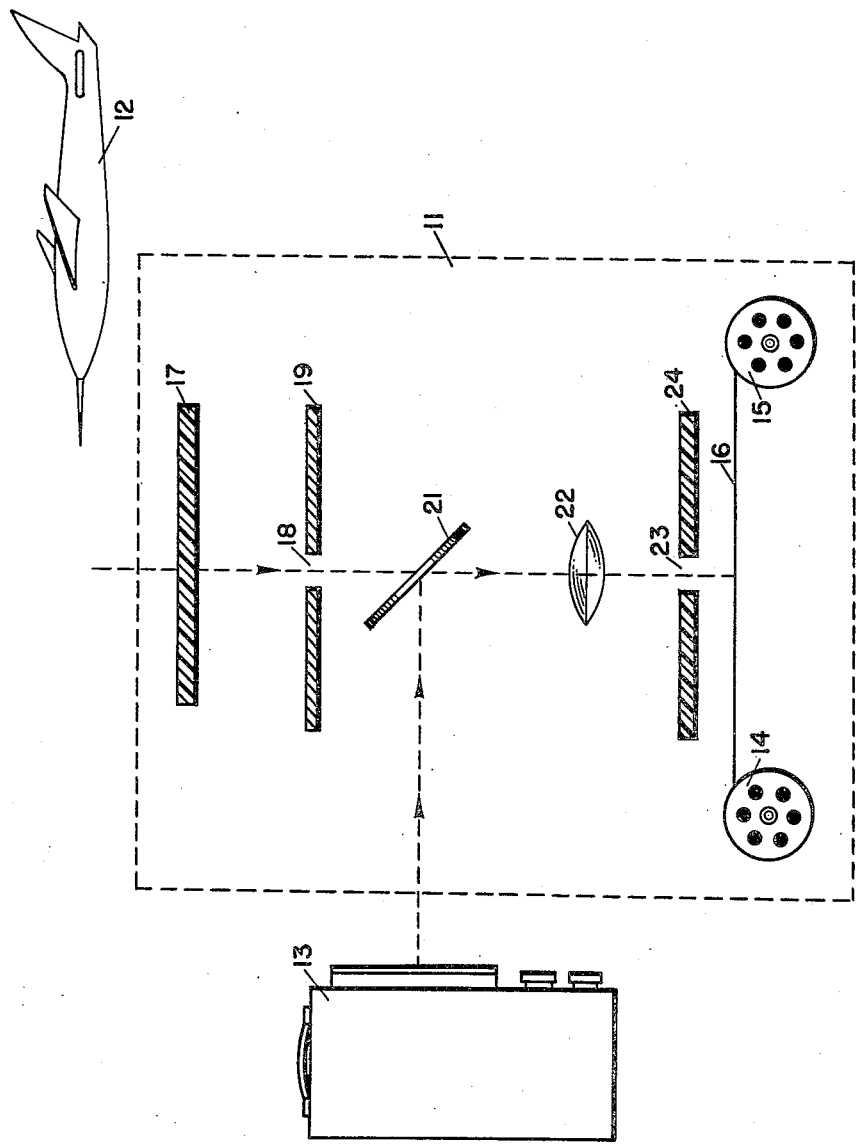
INVENTOR.
ARNOLD E. RESNIK
BY
ATTORNEYS much and the attendant advantages of
United States Patent Office

2,807,198
Patented Sept. 24, 1957

---

2,807,198

DUAL CHANNEL CAMERA

Arnold E. Resnik, Ontario, Calif.

Application June 27, 1956, Serial No. 594,335

3 Claims. (Cl. 95—1.1)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in a camera for simultaneously recording on film a moving object and an oscilloscope trace.

Such cameras, known as dual channel cameras, have been known in the art wherein the moving target is viewed by moving the film past a pair of aligned slots which provide a narrow field of view to permit the moving target to be recorded with clarity. In passing from one slot to the other the light passes through a transparent mirror and a lens for focusing the image on the film. An image from an oscilloscope coming from a different direction is reflected by the mirror, passes through the lens and then passes through the second slot to be simultaneously recorded on the film.

An alternate method of constructing a dual channel camera is similar to the one described above except for the fact that the image from the oscilloscope passes through a separate lens and is reflected by a mirror to the opposite side of the film and the target image is not required to pass through a transparent mirror.

In the prior art device first described the oscilloscope spot must be carefully positioned to ensure that its image will pass through the second slot. If this is not done, no image will be recorded. In the second apparatus described above this difficulty is eliminated since the oscillograph image does not have to pass through the slot, however, an additional lens is required.

The present invention consists essentially of an improvement in the first described prior art device, wherein a Polaroid film is positioned adjacent the first of the two aligned slots and the second slot is formed in a Polaroid film having its axis of polarization at right angles to the polarization of the first film. Therefore light coming from the moving target after passing through the first Polaroid film goes through the slot, the transparent mirror and the lens and is then restricted to the slot in the second Polaroid film. The image from the oscilloscope is reflected from the mirror and then passes through the lens, but is able to pass through any portion of the second Polaroid film since its light has not been previously polarized. This eliminates the requirement for careful alignment of the oscilloscope image so that it passes directly through the second slot.

One object of the present invention is to provide a dual channel camera for simultaneously recording a moving object and a second image such as an oscillograph trace which is simple and easy to operate.

Another object of the present invention is to provide a dual channel camera for simultaneously recording on film a moving object and oscillograph trace wherein the oscilloscope spot need not be carefully positioned so that its image will pass through a narrow slot in order to be recorded on the film.

A still further object of the present invention is to provide a dual channel camera for simultaneously recording on film a moving object and oscillograph trace which does not require two separate optical systems.

Other objects and many of the attendant advantages of this invention will be readily appreciated as the same becomes better understood by reference to the following detailed description when considered in connection with the accompanying drawings wherein the figure of the drawings is a schematic view illustrating one preferred embodiment of the present invention.

Referring now to the drawings in detail the basic optical elements of a camera illustrating one preferred embodiment of the present invention is shown within the dotted lines as indicated by the numeral 11 in the single figure of the drawing.

A moving target such as the aircraft 12 is adapted to move past the camera at high speed and the oscilloscope 13 is positioned adjacent the camera to indicate for recording a correlated function of the aircraft such as a signal trace generated by its proximity on certain electronic detecting equipment.

The basic elements of the camera consists of a pair of reels 14 and 15 which are adapted to move the film 16 continuously.

The image from the moving target 12 passes through a Polaroid or other polarizing filter 17 which is mounted adjacent the slot 18 formed in a suitable partition 19. The image then passes directly through the transparent mirror 21 and the lens 22 and then passes through a second slot 23 which is formed in a second Polaroid or polarizing filter 24 positioned between the lens 22 and the film 16.

The image from the oscilloscope 13 is reflected by the mirror 21 and then passes through the lens 22 for focusing on the film 16.

The direction of polarization of filter 17 is perpendicular to that of the filter 24 so that light from the target 12 can only reach the film 16 through the slit 23 in the filter 24 and therefore a narrow field of view is provided for recording the moving target 12 on the film 16 with clarity.

Since the light from the oscilloscope 13 is not polarized prior to passing through the filter 24 and the light has a random polarization, some components will pass through the filter 24 regardless of whether or not the beam is accurately positioned within the slit 23.

In constructing a camera according to the present invention it will be apparent that all the components illustrated in the figure of the drawing will be housed in a suitable lightproof enclosure and properly supported therein.

In certain applications of the present invention it will be apparent that colored filters may be utilized in place of the polarizing filters 17 and 24. For example, a blue color filter may be used in place of the polarizing filter 17, if the target transmits blue light, and a red color filter may be used in place of the polarizing filter 24, if the oscilloscope image transmits red light.

Obviously other filter combinations may be utilized where the target image is transmitted by one filter and cannot pass through the second filter having a narrow slot but where the image from the oscilloscope or other image which it is desired to be recorded simultaneously may pass through any portion of the second filter and is not required to pass through the slot therein.

Other objects and many of the attendant advantages of this invention will be readily appreciated as the same becomes better understood by reference to the detailed description when considered in connection with the accompanying drawings wherein what is claimed is:

1. A dual channel camera comprising an opaque partition having a narrow slot therein, a filter positioned adjacent said slot for filtering the light from a moving target passing therethrough, a second filter having a narrow slot therein in alignment with said first slot and being adapted to pass the light from said first filter only through said second slot, a transparent mirror positioned between said slots and adapted to pass light from the moving target therethrough and reflect light from another image, a lens positioned between said mirror and said second slot, and a moving film positioned adjacent said second slot on the opposite side of said mirror.

2. A dual channel camera as set forth in claim 1 wherein said filters are polarizing filters having their directions of polarization oriented at right angles to each other.

3. A dual channel camera as set forth in claim 1 wherein said filters are different colors whereby the light from a moving target passes through the first filter but can only pass through the slot in the second filter and the light from the other image is adapted to pass through the second filter.

No references cited.